(12) United States Patent
Elder

(10) Patent No.: US 9,589,485 B2
(45) Date of Patent: Mar. 7, 2017

(54) INTERACTIVE BRAKE DISPLAY SYSTEM

(71) Applicant: Ramon Elder, Denver, CO (US)

(72) Inventor: Ramon Elder, Denver, CO (US)

( * ) Notice: Subject to any disclaimer, the term of this patent is extended or adjusted under 35 U.S.C. 154(b) by 437 days.

(21) Appl. No.: 14/060,150

(22) Filed: Oct. 22, 2013

(65) Prior Publication Data

US 2014/0113271 A1    Apr. 24, 2014

Related U.S. Application Data

(60) Provisional application No. 61/716,759, filed on Oct. 22, 2012.

(51) Int. Cl.
*G09B 25/02* (2006.01)

(52) U.S. Cl.
CPC .................... *G09B 25/02* (2013.01)

(58) Field of Classification Search
CPC .................. G09B 25/02; G06F 7/00
USPC .............. 434/401; 73/118, 123; 701/29, 30
See application file for complete search history.

(56) References Cited

U.S. PATENT DOCUMENTS

| | | | |
|---|---|---|---|
| 1,722,659 A | 7/1929 | Clark | |
| 2,095,046 A | 10/1937 | Wilner | |
| 3,172,666 A | 3/1965 | Ryan | |
| 3,193,293 A | 7/1965 | Schaper | |
| 3,577,661 A | 5/1971 | Usrey | |
| 4,058,317 A | 11/1977 | McCarthy | |
| D254,793 S | 4/1980 | Morey | |
| D270,073 S * | 8/1983 | Morey | ........................... D19/62 |
| 4,468,033 A | 8/1984 | Minami et al. | |
| D286,060 S | 10/1986 | Morey | |
| D286,651 S | 11/1986 | Morey | |
| 5,100,142 A | 3/1992 | Cannata | |
| 5,194,031 A | 3/1993 | Sahler | |
| 5,346,420 A | 9/1994 | Glickman | |
| 5,621,168 A * | 4/1997 | Kim et al. | ...................... 73/123 |
| D528,162 S | 9/2006 | Lucas | |
| 7,309,064 B1 | 12/2007 | Engel | |
| D636,817 S | 4/2011 | Elder | |
| 2004/0107082 A1 * | 6/2004 | Sato et al. | ........................ 703/8 |
| 2011/0226049 A1 * | 9/2011 | Burgess et al. | ............ 73/118.01 |

OTHER PUBLICATIONS

Notice of Allowance for U.S. Appl. No. 29/428,388 mailed Jun. 26, 2013, 7 pages.
Notice of Allowance for U.S. Appl. No. 29/426,252 mailed Jun. 25, 2013, 7 pages.
Notice of Allowance for U.S. Appl. No. 29/426,253 mailed Jun. 26, 2013, 7 pages.

* cited by examiner

*Primary Examiner* — Xuan Thai
*Assistant Examiner* — Robert P Bullington
(74) *Attorney, Agent, or Firm* — Sheridan Ross P.C.

(57) ABSTRACT

An interactive physical display is provided. The display provides specific components of a system, such as a braking system, devoid of certain conventional features such that system operations are visible. An actuator for communication with a user is provided, the actuator allowing a user to activate features of the system.

10 Claims, 6 Drawing Sheets

INTERACTIVE BRAKE DISPLAY SYSTEM

This application claims the benefit of U.S. Provisional Patent Application Ser. No. 61/716,759, filed Oct. 22, 2012, the entire disclosure of which is incorporated by reference herein.

FIELD OF THE INVENTION

The embodiments of the present invention relate generally to interactive displays and models.

BACKGROUND

Physical displays are useful for presenting a variety of information to a consumer. While electronic displays and graphical user interfaces have become increasingly indispensible in the modern era, certain devices, mechanisms, and concepts are best illustrated using physical models. This is particularly true for mechanical devices.

In the field of automotive devices and related repair, for example, many systems and components are not visually apparent to a novice consumer. This lack of transparency into such systems and components leaves many automobile owners and customers of automotive services confused or overwhelmed by what devices and services they may need or not need. Additionally, automotive service professionals often have difficultly conveying to customers and potential customers what products, devices, and services the customer requires and why such products and services are desirable. These professionals are often left trying to explain complex systems to individuals with minimal technical proficiency without the assistance of visual aids.

SUMMARY OF THE INVENTION

Accordingly, embodiments of the present invention contemplate a novel system, device, and method for displaying automotive components and systems. One embodiment of the present invention provides a physical display for an automobile braking system. As used herein, the terms "braking system" or "brake" shall not be construed as referring to any particular type of brake, but shall refer generally to any one or more braking components for impeding or converting kinetic energy of a component. Braking system displays include, for example, physically displays related to disc brakes, drum brakes, regenerative brakes, rim brakes (e.g., for use in bicycles), frictional brakes, pumping brakes, and electromagnetic brakes.

In one embodiment, at least a portion of a braking system is provided as an interactive physical display separate from its intended function (e.g., removed from an automobile). The interactive display includes at least one functioning element of the brake, such as a caliper that is capable of being safely and easily actuated by a user to view exemplary operation of the device. An actuator is provided that includes a user interface for selectively moving system components and simulating, for example, braking action and force. In various embodiments, the actuator includes a lever, a hand pump, a foot pedal, a toggle switch, a slider switch, or any combination thereof.

In certain embodiments, the display provides additional information to the consumer. Some embodiments of the contemplated displays include a sensor array that can detect the forces applied to the braking components and provide information related to, but not limited to, the magnitude of a force applied by the consumer, the magnitude of a resultant force applied by a braking component, and the speed and/or change in speed of particular components. The sensor array is in signal communication with and transmits collected information to a computer. The computer is operable to determine a predicted or simulated stopping distance for an associated automobile and then present the information to the consumer on a display screen. In one embodiment, audible information is provided to the consumer such as sounds associated with worn or damaged parts. The sounds may be simulated by speakers connected to the computer. Sounds may also be created by the interaction of actual components installed on the display.

A handle is provided in one embodiment to provide a gripping surface for a user (i.e., the automotive technician) to lift and/or transport the display. The handle is preferably provided such that a user may hold or carry the device in a generally ergonomic fashion. More specifically, the present invention contemplates providing a handle that enables a user to carry or hold the device in a balanced position with certain components spaced apart from the user's body. It will be expressly recognized that the specific placement of the handle in such embodiments will be a function of, for example, the center of gravity and moment of inertia of the overall device.

In one embodiment, instructions cause a computer to execute a method of simulating and displaying a braking function. More specifically, the instructions may cause a computer to apply a rotational force to a rotational component of a braking element. The computer may measure a rate of rotation of the rotational component. The instructions may cause the computer to transmit a braking force to a brake shoe or a brake pad of the braking element. The instructions further enable the computer to measure a change in the rate of rotation, determine a predicted stopping distance for a simulated automobile of a type operated by a customer, and then present the information on a display screen. Instructions may also be provided that cause a speaker to generate sounds representing worn or damaged components of a brake system.

In various embodiments, moving parts are provided in displays, such as tires, wheels, discs, rotors, shoes, and pads. In such embodiments, it is contemplated that one or more translucent casings or shields may be provided to reduce a risk of injury to a user or damage to the display. For example, where the interaction between a moving rotor and a brake pad is displayed, it may be desirable to prevent user contact from such devices. Accordingly, a translucent shield, cover, or casing is provided, such as a Lucite shield, to prevent contact from device components. Additional system components, such as a user-operated actuator is provided external to such a shield. In another embodiment, worn or defective parts may be installed on the display. In some embodiments, the display includes a motor to impart a rotational force to components of the display to simulate driving conditions.

It is one aspect of embodiments of the present invention to provide an interactive display device for simulating and displaying a braking function, the display comprising: a braking element comprising at least one rotational component and at least one brake; means for applying rotation to the at least one rotational component; an actuator for receiving a force from a user and transmitting said force to said at least one brake; a stand supporting at least the braking element in a predetermined position; and a handle interconnected to the display for at least one of lifting and moving the display.

It is another aspect of embodiments of the present invention to provide a non-transitory computer readable storage medium having stored thereon instructions that cause a processor to execute a method of simulating and displaying a braking function, the instructions comprising: instructions to apply a rotation to a rotational component of a braking element; instructions to measure a rate of rotation of the rotational component; instructions to transmit a braking force to a brake shoe or a brake pad of the braking element; instructions to measure a change in the rate of rotation; instructions to determine a predicted stopping distance for an associated automobile; and instructions to display the predicted stopping distance on a display screen.

In one embodiment, a method of displaying braking function is provided, the method comprising providing: an interactive physical display comprising at least a portion of at least one of a disc brake, a drum brake, and a regenerative brake, the brake in force transmitting communication with a user-actuated device, applying a force to the user-actuated device, and displaying information to a user related to a braking force resulting from the force applied to the user-actuated device.

It is still yet another aspect of the present invention to provide a method of simulating and displaying a braking function, the method comprising: providing a braking element comprising at least one rotational component and at least one brake; applying rotation to the at least one rotational component; applying force to an actuator; and transmitting the force to the at least one brake, wherein the brake contacts the at least one rotational component.

The Summary of the Invention is neither intended nor should it be construed as being representative of the full extent and scope of the present disclosure. The present disclosure is set forth in various levels of detail in the Summary of the Invention as well as in the attached drawings and the Detailed Description of the Invention and no limitation as to the scope of the present disclosure is intended by either the inclusion or non-inclusion of elements, components, etc. in this Summary of the Invention. Additional aspects of the present disclosure will become more readily apparent from the Detailed Description, particularly when taken together with the drawings.

These and other advantages will be apparent from the disclosure of the invention(s) contained herein. The above-described embodiments, objectives, and configurations are neither complete nor exhaustive. As will be appreciated, other embodiments of the invention are possible using, alone or in combination, one or more of the features set forth above or described in detail below. Further, the Summary of the Invention is neither intended nor should it be construed as being representative of the full extent and scope of the present invention. The present invention is set forth in various levels of detail in the Summary of the Invention, as well as, in the attached drawings and the Detailed Description of the invention and no limitation as to the scope of the present invention is intended to either the inclusion or non-inclusion of elements, components, etc. in this summary of the invention. Additional aspects of the present invention will become more readily apparent from the detailed description, particularly when taken together with the drawings.

BRIEF DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure invention and is not meant to limit the inventive concepts disclosed herein.

The accompanying drawings, which are incorporated in and constitute a part of the specification, illustrate embodiments of the disclosure and together with the general description of the disclosure given above and the detailed description of the drawings given below, serve to explain the principles of the disclosures.

It should be understood that the drawings are not necessarily to scale. In certain instances, details that are not necessary for an understanding of the disclosure or that render other details difficult to perceive may have been omitted. It should also be understood, of course, that the disclosure is not necessarily limited to the particular embodiments illustrated herein.

Figure 1:
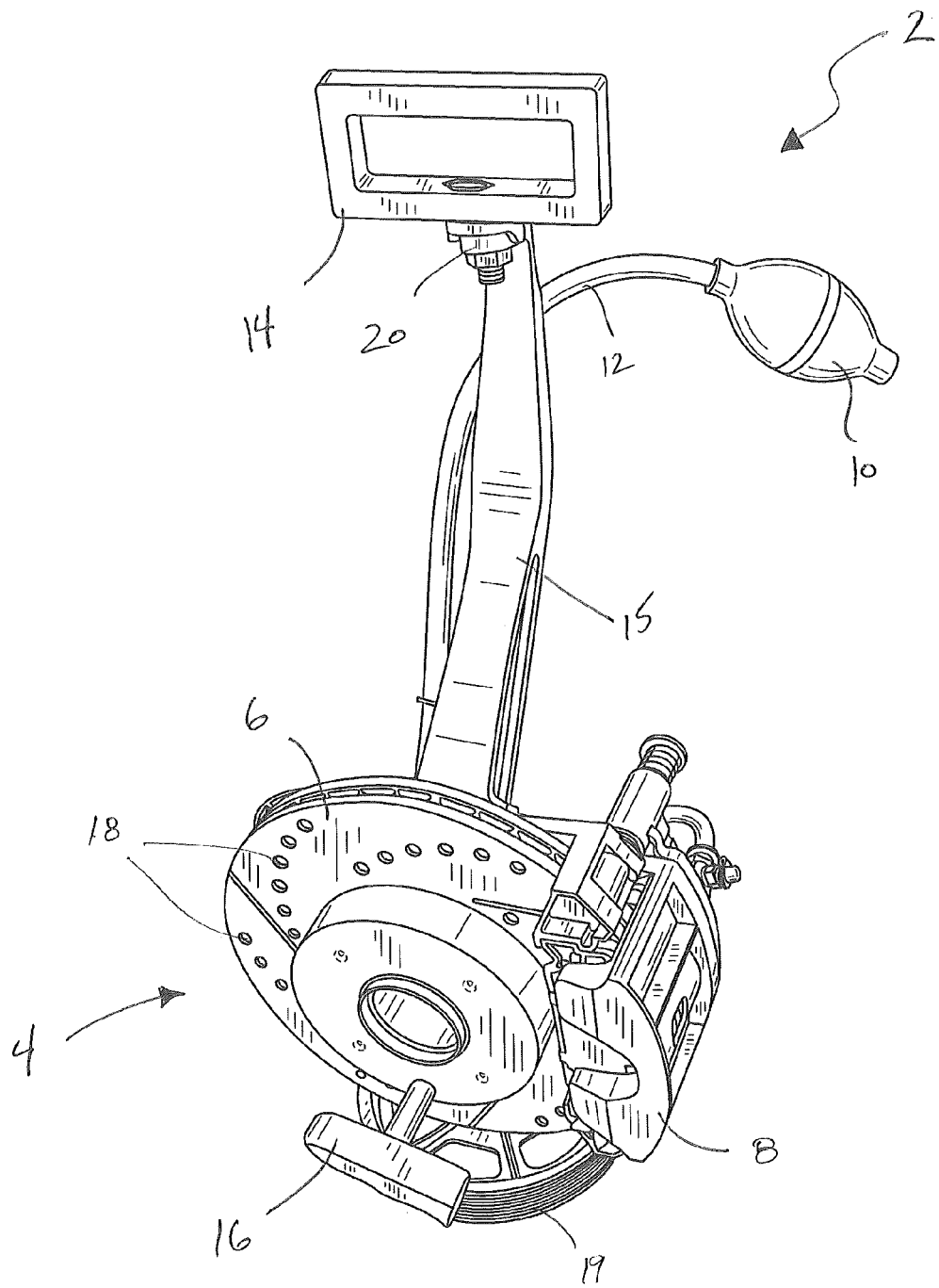
Figure 2:
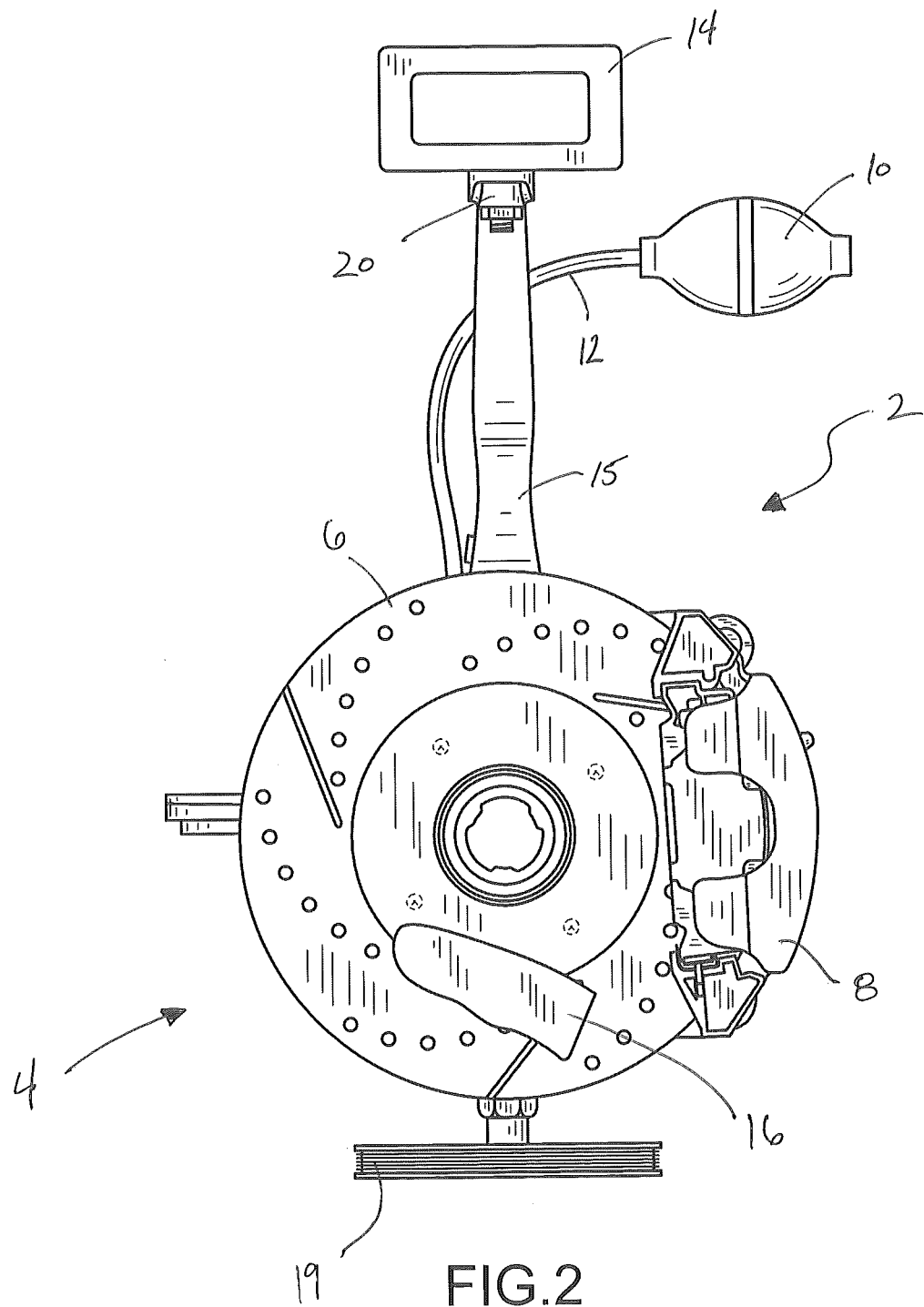
Figure 3:
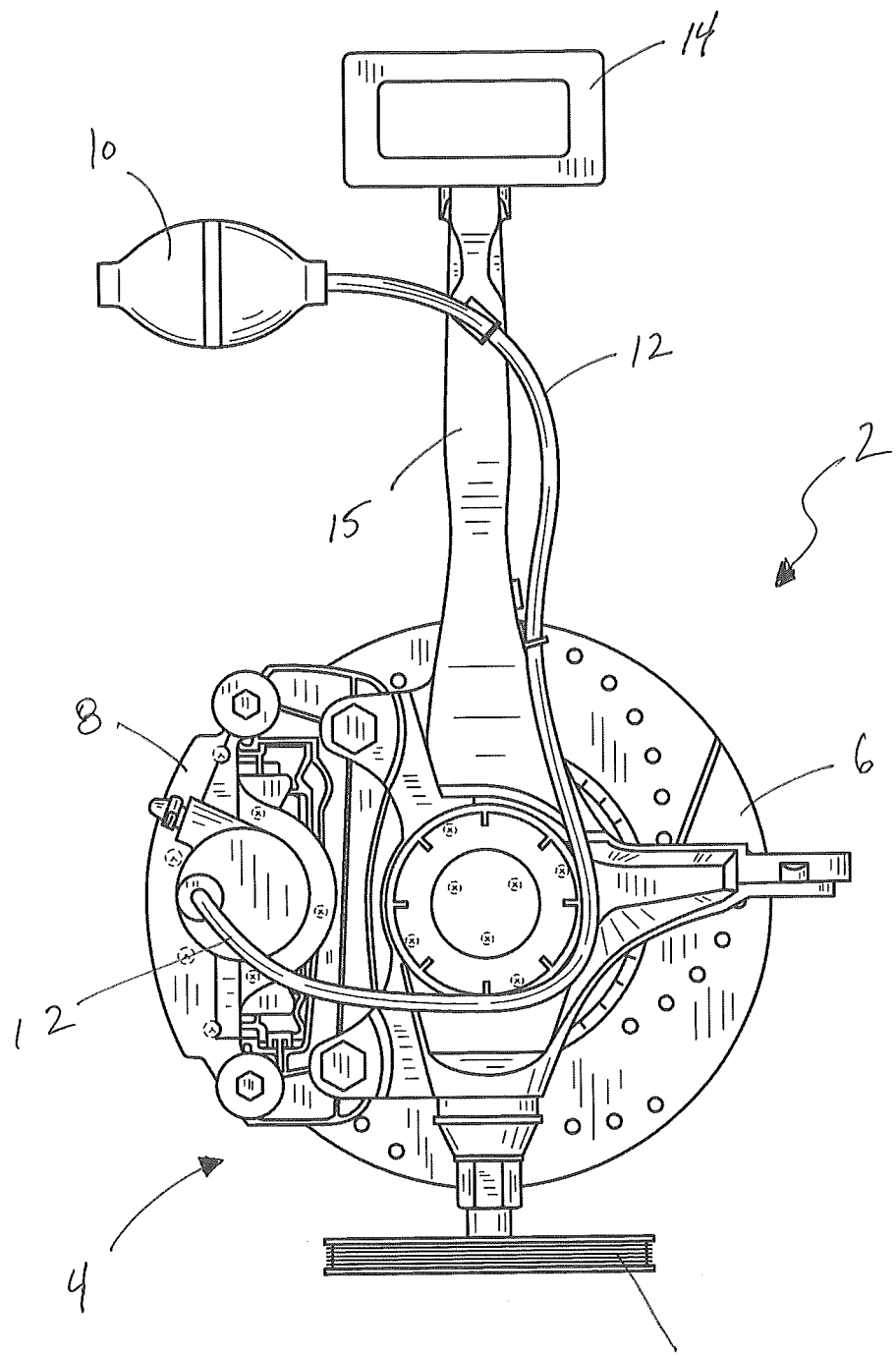
Figure 4:
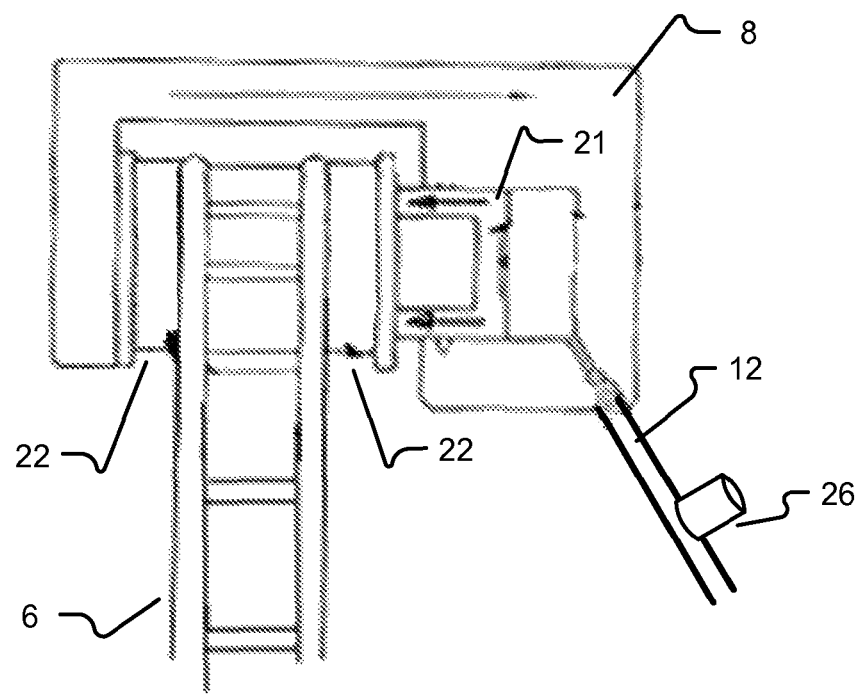
Figure 5A:
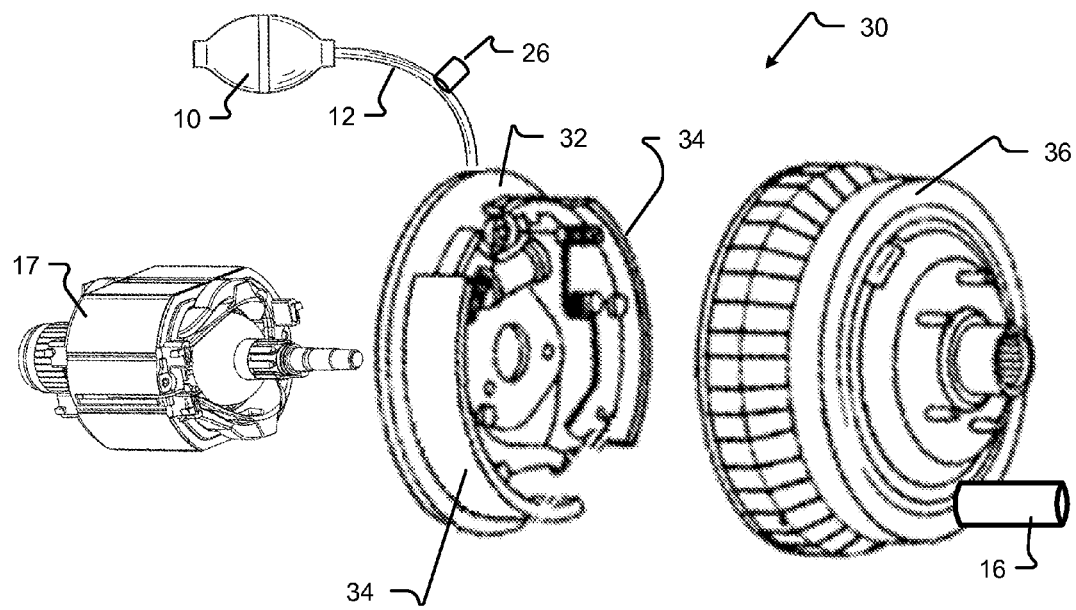
Figure 5B:
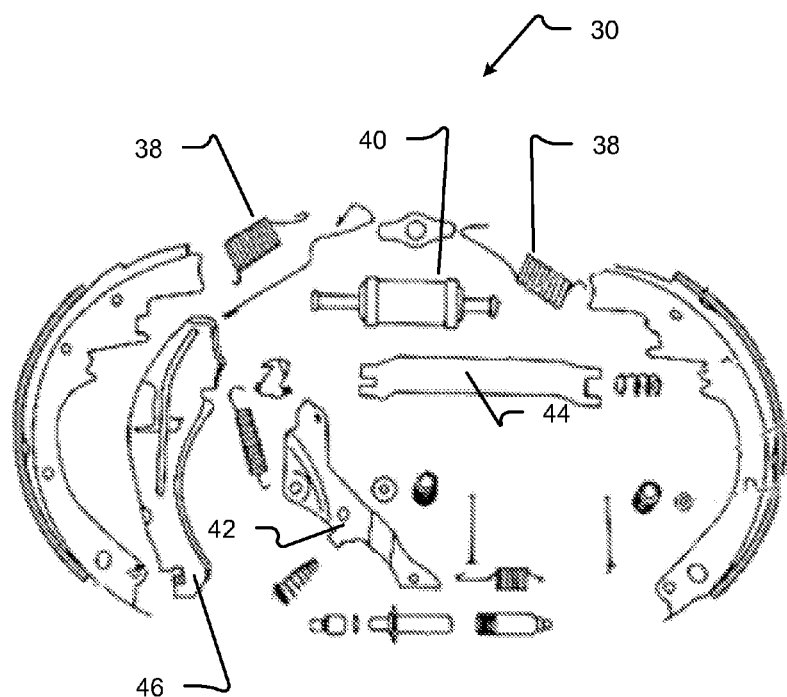
Figure 6:
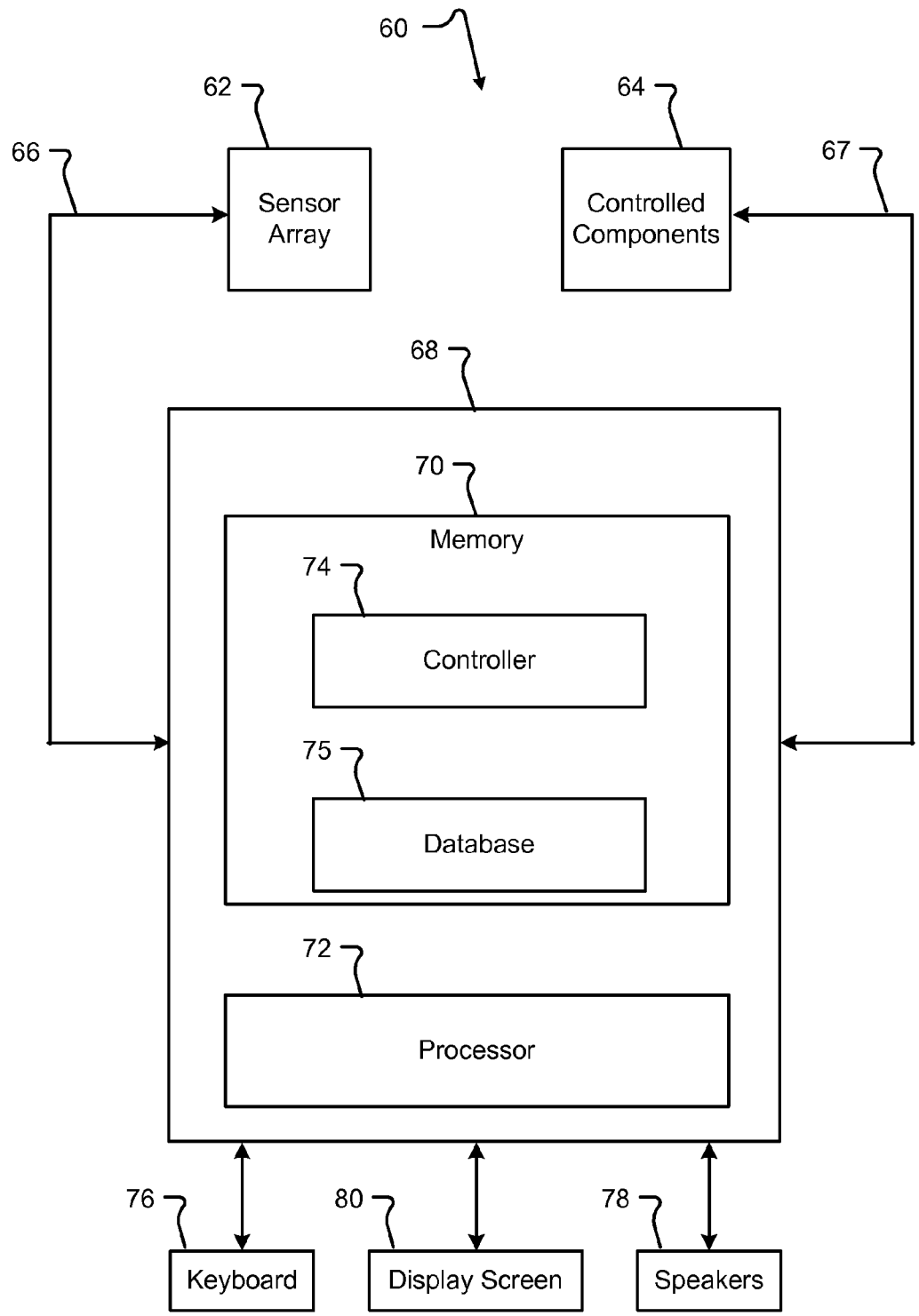

FIG. 1 is a perspective view of an interactive brake display according to one embodiment of the present invention;

FIG. 2 is a front elevation view of the embodiment of the present invention shown in FIG. 1;

FIG. 3 is rear elevation view of the embodiment of the present invention shown in FIG. 1;

FIG. 4 is a detail view of a brake shoe of an interactive brake display according to one embodiment of the present invention;

FIG. 5A is an exploded perspective view of a drum brake of an interactive brake display according to one embodiment of the present invention;

FIG. 5B is a detail view of a drum brake used in conjunction with one embodiment of an interactive brake display according to one embodiment of the present invention; and FIG. 6 is a block diagram of a control architecture for an interactive brake display according to one embodiment of the present invention.

Provided below is a list of various features and corresponding indicia provided in the Figures:

| Component | # |
| --- | --- |
| Display | 2 |
| Brake element | 4 |
| Disc | 6 |
| Brake Shoe | 8 |
| Actuator | 10 |
| Pneumatic line | 12 |
| Support | 14 |
| Shaft | 15 |
| Handle | 16 |
| Motor | 17 |
| Vents | 18 |
| Stand | 19 |
| Fastener | 20 |
| Piston | 21 |
| Brake pads | 22 |
| Release valve | 26 |
| Drum brake | 30 |
| Backing plate | 32 |
| Break shoes | 34 |
| Drum | 36 |
| Return springs | 38 |
| Wheel cylinders | 40 |
| Adjuster levers | 42 |
| Strut | 44 |
| Parking Brake | 46 |
| System | 60 |
| Sensor array | 62 |
| Controlled devices | 64 |
| Channel | 66 |

-continued

| Component | # |
|---|---|
| Channel | 67 |
| Computer | 68 |
| Memory | 70 |
| Processor | 72 |
| Controller | 74 |
| Database | 75 |
| Keyboard | 76 |
| Speakers | 78 |
| Display | 80 |

DETAILED DESCRIPTION

Embodiments of the present invention have significant benefits across a broad spectrum of endeavors. To acquaint persons skilled in the pertinent arts most closely related to the present invention, a preferred embodiment of the method that illustrates the best mode now contemplated for putting the invention into practice is described herein by, and with reference to, the annexed drawings that form a part of the specification. The exemplary method is described in detail without attempting to describe all of the various forms and modifications in which the invention might be embodied. As such, the embodiments described herein are illustrative, and as will become apparent to those skilled in the arts, can be modified in numerous ways within the scope and spirit of the disclosure.

The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the invention.

FIGS. 1-5 show an interactive display 2 comprising a brake element 4. The brake element of FIG. 1 comprises a rotor or disc 6 and a brake shoe 8, the shoe 8 comprising one or more pads for contacting the disc 6. The brake element 4 in the depicted embodiment comprises a portion of a complete braking system as it would be found, for example, in an automobile. The brake element 4 omits certain features to facilitate viewing and identification of specific components. Preferably, however, the portions of the brake element 4 that are provided are actual brake components, or near approximations thereof, in size, shape, form, materials, etc. The disc 6 of FIG. 1 comprises vent features 18 and is the same or similar brake that would be installed in a complete automobile. In alternative embodiments, scale models of actual components are provided. One of skill in the art will appreciate that the display 2 may be fixedly attached to a counter, wall, or floor of an automotive service location.

The display 2 provided in FIGS. 1-3 comprises a device for imparting a force upon disc 6 to create rotation. As shown, a handle 16 is provided in force transmitting communication with the disc 6. The handle 16, which is preferably rotatable about an axis parallel to an axis of rotation of the disc 6, is grasped and controlled by a user to provide rotation to the disc 6 and simulate driving conditions. When the handle 16 is released, the disc 6 will rotate under the momentum imparted. The handle 16 may be removed when desired.

Although not shown in FIG. 1, various alternative embodiments comprise means for imparting a force upon the disc 6 including, but not limited to: electric motors, control switches, pumps, and similar devices. As such, the present disclosure is not limited to handles or even direct connections to the disc 6 to induce rotation thereof.

An actuator 10 is provided to activate braking features of the display 2. In FIGS. 1-3 and 5, the actuator 10 is depicted as a bulb pump for grasping and squeezing by a user. The actuator 10 transmits force through a pressure line 12 in communication with brake shoe 8 and activates the brake shoe 8 and associated pads, thus applying a braking force upon the disc 6. Accordingly, a system is provided whereby particular features of a brake system are provided in a manner whereby they are visible to the user and consumer. Certain components, such as tires, wheels, and brake lines, for example, are omitted for simplification of the device and to allow visibility. A conventional brake line is simulated by an actuator 10 and pressure line 12 which allow a user to activate braking actions and visualize the braking effects in real time.

While FIGS. 1-3 and 5 depict an actuator 10 and associated pressure line 12 comprising a bulb pump, it will be expressly recognized that the present invention is not so limited. More specifically, various alternative embodiments are contemplated, including, for example, an embodiment comprising one or more levers for grasping by a user's hand. The lever(s) may convey or transmit force to the braking element 4 by a hydraulic line, a pneumatic line, or one or more cables. Additionally, it will be recognized that the present invention is not limited to an actuator for control by a user's hand. In various embodiments, a foot pedal is provided as an actuator device. The foot pedal may comprise, for example, a replica of a standard brake pedal for transmitting a force to the braking element 4. In some embodiments, the components of the brake element 4 may be electric or pneumatic actuators activated by a controller as described below in conjunction with FIG. 6.

To aid in displaying information, the embodiment depicted in FIGS. 1-3 comprises a stand feature 19, which may be used with all embodiments. The depicted stand feature 19 provides a stable base for the display 2 and allows moving parts, such as rotating disc 6, to be suspended and thus rotate freely. The stand 19 further comprises, in at least some embodiments, the ability to rotate portions of the display 2. In such embodiments, the stand 19 comprises a swivel or point of rotation located substantially at its center, allowing additional display features to be rotated without moving the stand 19.

FIGS. 1-3 depict an embodiment comprising a handle 14 for aiding in movement and manipulation of the display 2. The handle 14 provides a point of contact for a user to grasp, lift, and convey the device 2. The handle portion 14 is interconnected to device components via rigid support 15. The display 2 and handle 14 features thus provide a portable device which may be conveyed to different locations with relative ease. Where the handle features 14, 15 are not desired, the features may be removed. Fasteners 20 are provided at the connection between the handle 14 and the support 15 and/or between the support 15 and a remainder of the display 2. Fasteners 20 include, but are not limited to, known fasteners such as nut and bolt connections.

In one embodiment, illustrated in FIG. 4, the brake shoe 8 comprises a piston 21 and two brake pads 22 that may be selectively removed and replaced to demonstrate to the customer the steps involved in servicing an automobile braking system. Sensors (not shown) may be attached to the disc 6, piston 21, and brake pads 22. New brake pads 22 of different brands, types, and materials may then be installed on the brake shoe 8 to demonstrate to the customer the benefits of the different brands of brake pads and different brake pad materials. For example, brake pads are available in many types and qualities. Some new brake pads may have a longer life, other new brake pads may be quieter in operation, and some new brake pads may provide better stopping ability. Installing different types and brands of brake pads on the display and allowing the consumer to handle the brake pads may help the automotive technician explain required service and options available to the customer.

The brake pads 22 may also be removed and replaced with examples of worn brake pads (not illustrated). The various examples of worn brake pads may be installed on the brake shoe 8 to demonstrate different examples of brake wear and brake failure, and symptoms of brake wear and failure. More specifically, a set of worn brake pads may be installed on the brake shoe 8 to illustrate diminished braking efficiency. Worn brake pads may also be installed that produce noises associated with metal-on-metal contact of the worn brake pads and the disc 6. When brake pads become worn to the point of causing metal-on-metal contact, severe damage to the disc 6 may occur. The worn brake pads can be shown to a customer and handled by the customer to further illustrate the need for service of the customer's braking system. In some embodiments, a computer and speakers may generate sounds that are typical of worn or damaged brake components.

To further illustrate elements involved in servicing an automobile braking system, the rotor or disc 6 may be removed and replaced with worn or damaged disc (not illustrated). Discs 6 can wear out and be damaged, frequently when ridges and/or groves are formed by repeated contract by the brake pads 22. Discs 6 may also warp. In addition, as previously discussed, when brake pads are not replaced when required, metal-on-metal contact may occur and cause severe damage to the disc 6. Examples of worn or warped discs may be installed on the display 2 to illustrate symptoms associated therewith. For example, a worn disc may be installed with a set of new brake pads 22 to show the customer that braking efficiency will remain diminished when a worn disc 6 is not replaced. A worn disc that has previously been machined may be removed to show that only a certain amount of material can be removed from a worn disc before the worn disc must be discarded and replaced by a new disc 6.

Brake shoes 8 must be serviced or repaired if they leak brake fluid. Two main types of brake shoes 8 (or calipers) are manufactured: floating shoes and fixed shoes. The floating and fixed shoes are different and have different service requirements and costs associated therewith. In one embodiment, the brake shoe 8 may be removed and replaced with a brake shoe of a type installed on a customer's vehicle. The automotive service professional may then use the brake shoe to illustrate to the customer the reason for a suggested or required service of the brake shoe. In one embodiment, a defective or damaged brake shoe may be installed on the display 2 to illustrate a braking system defect identified in the customer's automobile. For example, if the customer's brake shoe is leaking brake fluid, a brake shoe of the same type could be installed on the display 2. The brake shoe may simulate a leak such that the actuator 10 does not work efficiently to demonstrate the products and service required by the customer. In one embodiment, an adjustable opening or valve 26 may be selectively opened and closed in the pneumatic line 12 to simulate the effects of a fluid leak. The adjustable opening 26 may consist of a threaded opening that may be partially or completely closed with a matching screw.

As previously mentioned, the brake element 4 may comprise a drum brake 30, as illustrated in FIG. 5A. Drum brakes 30 comprise a backing plate 32, brake shoes 34, and a drum 36 that is seated against the backing plate 32. Like disc brake pads 22, brake shoes 34 have a friction lining that eventually wears out and must be replaced. In one embodiment, the display includes a drum brake 30 with brake shoes 34 that may be selectively removed and replaced to demonstrate different examples and symptoms of brake shoe wear and failure to a customer. Worn or defective brake shoes 34 may be installed on the drum brake 30 to duplicate and illustrate a problem identified with the customer's brakes. To provide visual access, all or a portion of the drum 36 may be transparent.

Drums 36 also require service and become worn at locations where the brake shoes 34 contact an inner surface of the drum 36. To demonstrate the need for drum 36 service, a worn or damaged drum (not illustrated) may be installed on display 2.

The drum brake 30 is comprised of many individual parts, as illustrated in FIG. 5B, including return springs 38, heel cylinders 40, adjuster levers 42, struts 44, and the parking brake lever 46. The individual parts may require service, adjustment or replacement. The drum 36 may be removed from the display 2 and individual parts of the drum brake 30 may also be removed and replaced so the service professional may illustrate to the customer specific parts that require service or replacement. The service professional can also install defective, damaged, or worn parts in the drum brake 30 to demonstrate the effects of part failure if requirement service is not performed.

The drum brake 30 may include a handle 16 or electric motor 17 to impart a rotational force to the drum 36 and to stop the rotation of the drum. As previously discussed, an actuator 10 may activate the brake features of the drum brake 30. In one embodiment, sensors and actuators (not shown) may be attached to the motor 17, brake shoes 34, brake drum 36, return springs 38, wheel cylinders 40, adjuster levers 42, struts 44, and the parking brake lever 46. The sensors may monitor and record the relative motion and positions of the components and the actuators may control and actuate the components of the display to demonstrate the operation of the drum brake 30.

FIG. 6 depicts a control and signal processing system 60 for any of the embodiments of the present disclosure discussed above. The system 60 includes a sensor array 62 and controlled components 64 in signal communication via channels 66 and 67 with a computer 68.

The sensor array 62 comprises linear or angular position sensors that, among other things, track the relative and/or absolute positions of the various movable components and the alignment of various stationary and moveable components, such as, but not limited to, the disc 6, brake shoe 8, brake pads 22, calipers, pistons 21, motors, brake plates 32, brake shoes 34, drum 36, return springs 38, wheel cylinders 40, adjuster levers 42, struts 44, and parking brake 46. The sensor array 62 may comprise any suitable type of positional sensors, including inductive non-contact position sensors, string potentiometers, linear variable differential transformers, potentiometers, capacitive transducers, eddy-current sensors, Hall effect sensors, proximity sensors (optical), grating sensors, optical encoders (rotary or linear), and photodiode arrays.

Controlled components 64 are any components having an operation or feature controlled by the computer 68. Controlled components include the various movable or activatable components, such as, but not limited to, the disc 6, brake shoe 8, motor 17, brake pads 22, calipers, pistons 21, brake plates 32, brake shoes 34, drum 36, return springs 38, wheel cylinders 40, adjuster levers 42, struts 44, and parking brake 46.

The computer 68 may comprise a software-controlled device that includes, in memory 70, a number of modules executable by a processor 72. The executable modules include a controller 74 to receive and process positioning signals from the sensor array 62 and generate and transmit appropriate commands to the controlled components 64. The computer 68 is operable to determine a predicated stopping distance for an associated automobile using data from the sensor array 62 including the rate of rotation of the disc 6 or drum 36 and the amount of force applied by the brake pads 22 or brake shoes 34. The computer 68 may also determine a simulated speed of a simulated automobile using the rate of rotation of the disc 6 or drum 36. In another embodiment, the computer can determine and display a predicted stopping distance for a simulated automobile using one or more worn or defective components installed on the display 2.

In one embodiment, the computer 68 may include a database 75 that stores information on braking capability and weight of automobiles of all makes, models, and years. The database 75 may have a plurality of data fields including, but not limited to: a vehicle make, model, and year; vehicle mass; stopping distances at various velocities and under various conditions (such as dry, wet, icy, etc); and sounds associated with worn, damaged, or defective parts of an automobile brake system. The computer 68 may be connected to a network to update the database. The network may be any type of network familiar to those skilled in the art that can support data communications using any of a variety of commercially-available protocols, including without limitation TCP/IP, SNA, IPX, AppleTalk, and the like. Merely by way of example, the network 120 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

In one embodiment, the controller 74 provides a control input to the electronic motor 17 and/or the brake calipers. In another embodiment, the computer 68 may generate signals to simulate noises associated with malfunctioning or worn parts that may be played by speakers 78. In another embodiment, the disclosed systems and methods may be partially implemented in software that can be stored on a storage medium to include a computer-readable medium, executed on a programmed general-purpose computer with the cooperation of a controller and memory, a special purpose computer, a microprocessor, or the like. In these instances, the systems and methods of this disclosure can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

In one embodiment, one or more computers are used to control, among other things, the disc 6, brake shoe 8, motor 17, brake pads 22, calipers, pistons 21, brake plates 32, brake shoes 34, drum 36, return springs 38, wheel cylinders 40, adjuster levers 42, struts 44, and parking brake 46. In one embodiment, the user interacts with the computer through any means known to those skilled in the art, to include a keyboard 76, speakers 78, and/or display 80 to include a touch-screen display. The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

While various embodiments of the present invention have been described in detail, it is apparent that modifications and alterations of those embodiments will occur to those skilled in the art. However, it is to be expressly understood that such modifications and alterations are within the scope and spirit of the present disclosure. Further, the invention(s) described herein are capable of other embodiments and of being practiced or of being carried out in various ways. In addition, it is to be understood that the phraseology and terminology used herein is for the purpose of description and should not be regarded as limiting. The use of "including," "comprising," or "adding" and variations thereof herein are meant to encompass the items listed thereafter and equivalents thereof, as well as, additional items.

What is claimed is:

1. An interactive display device for simulating and displaying a braking function, the interactive display comprising:
    a braking element comprising at least one rotational component and at least one brake;
    a handle for applying rotation to the at least one rotational component;
    an actuator for receiving a force from a user and transmitting said force to said at least one brake;
    a stand supporting at least the braking element such that the rotational component is freely rotatable, wherein the stand includes a swivel such that at least the braking element is rotatable about an axis of the stand.

2. The interactive display of claim 1, wherein the at least one rotational component comprises a disc.

3. The interactive display of claim 1, wherein the at least one brake comprises a friction brake.

4. The interactive display of claim 1, wherein the handle is interconnected to the at least one rotational component.

5. The interactive display of claim 1, wherein the actuator comprises at least one of a bulb pump, a hand lever, and a foot pedal.

6. The interactive display of claim 1, wherein the interactive display comprises a display screen with a graphical user interface for displaying at least one of the force applied to the actuator and a resultant braking force.

7. The interactive display of claim 1, wherein the rotational motion of the rotational component is not converted to linear motion.

8. The interactive display of claim 1, further comprising:
a computer;
a display screen; and
a sensor array in communication with the computer, the at least one rotational component, and the at least one brake, wherein the computer is operable to determine a predicted stopping distance for an associated automobile using data received from the sensor array including a rate of rotation of the at least one rotational component and an amount of force applied by the at least one brake, and wherein the display screen is operable to display the predicted stopping distance.

9. The interactive display of claim 1, wherein the braking element is separate from an automobile.

10. The interactive display of claim 1, wherein the handle is rotatable about an axis parallel to an axis of rotation of the at least one rotational component.

* * * * *